(12) United States Patent
Taki et al.

(10) Patent No.: US 12,190,092 B2
(45) Date of Patent: Jan. 7, 2025

(54) CONTROL DEVICE AND TERMINAL DEVICE

(71) Applicant: HONDA MOTOR CO., LTD., Tokyo (JP)

(72) Inventors: Tomoaki Taki, Tokyo (JP); Takeshi Kanda, Tokyo (JP); Toshimi Hamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 17/677,315

(22) Filed: Feb. 22, 2022

(65) Prior Publication Data

US 2022/0308857 A1  Sep. 29, 2022

(30) Foreign Application Priority Data

Mar. 25, 2021 (JP) ................................. 2021-051920

(51) Int. Cl.
*G06F 8/65* (2018.01)
*B60W 50/00* (2006.01)
(Continued)

(52) U.S. Cl.
CPC ............... *G06F 8/65* (2013.01); *B60W 50/00* (2013.01); *G07C 5/008* (2013.01); *G07C 5/0808* (2013.01);
(Continued)

(58) Field of Classification Search
CPC ........................................................ G06F 8/65
(Continued)

(56) References Cited

U.S. PATENT DOCUMENTS 9,639,344 B2 * 5/2017 Rockwell .................. G06F 8/65
9,916,151 B2 * 3/2018 Ye .......................... H04W 12/10
(Continued)

FOREIGN PATENT DOCUMENTS

CN 108279917 A * 7/2018 ............... G06F 8/65
CN 108701340 A * 10/2018 ............. B60R 16/02
(Continued)

OTHER PUBLICATIONS

Japanese Office Action dated Jan. 10, 2023 issued in corresponding Japanese application No. 2021-051920; English machine translation included (17 pages).

*Primary Examiner* — Francisco J Aponte
(74) *Attorney, Agent, or Firm* — Rankin, Hill & Clark LLP

(57) ABSTRACT

A control device mounted on a vehicle and configured in such a manner that a program incorporated in a first vehicle control unit can be updated by first updating means and a program incorporated in a second vehicle control unit can be updated by second updating means that is different from the first updating means, the control device including a request reception unit causing the first updating means to receive an acquisition request of acquiring version information about a version of the program of the second vehicle control unit; and a transmission control unit causing the first updating means to transmit the version information according to the acquisition request. The first and second updating means are means for acquiring an update program from a device outside the vehicle, and one of the first and second updating means acquires a program from a device outside the vehicle via a communication unit.

11 Claims, 9 Drawing Sheets

(51) Int. Cl.
*G07C 5/00* (2006.01)
*G07C 5/08* (2006.01)
(52) U.S. Cl.
CPC . *B60W 2050/0083* (2013.01); *B60W 2556/45* (2020.02)
(58) Field of Classification Search
USPC .......................................................... 717/169
See application file for complete search history.

(56) References Cited

U.S. PATENT DOCUMENTS

| | | | | |
|---|---|---|---|---|
| 10,387,139 | B2* | 8/2019 | Fox | G06F 8/658 |
| 10,599,420 | B2* | 3/2020 | Quin | H04L 63/123 |
| 11,137,997 | B2* | 10/2021 | Fox | G06F 12/0646 |
| 2015/0347121 | A1 | 12/2015 | Harumoto | |
| 2018/0024826 | A1* | 1/2018 | Caushi | G06F 8/65 |
| | | | | 717/172 |
| 2018/0032324 | A1* | 2/2018 | Sarkar | G06F 8/65 |
| 2018/0232223 | A1* | 8/2018 | Madrid | G06F 8/71 |
| 2018/0300123 | A1* | 10/2018 | Willis | G07C 5/008 |
| 2019/0034256 | A1* | 1/2019 | Fox | G06F 8/658 |
| 2019/0324739 | A1* | 10/2019 | Fox | B60W 50/02 |
| 2019/0325666 | A1 | 10/2019 | Teraoka | |
| 2020/0034138 | A1* | 1/2020 | Ishikawa | H04W 4/44 |
| 2020/0081699 | A1* | 3/2020 | Majed | G06F 8/65 |
| 2020/0311255 | A1* | 10/2020 | Fox | G06F 11/3612 |
| 2021/0011709 | A1* | 1/2021 | Itatsu | B60R 16/02 |
| 2022/0024471 | A1* | 1/2022 | Itatsu | G06F 11/07 |
| 2023/0145100 | A1* | 5/2023 | Nagata | G06F 11/1456 |
| | | | | 717/168 |
| 2024/0020111 | A1* | 1/2024 | Han | G06F 8/65 |

FOREIGN PATENT DOCUMENTS

| | | | | | |
|---|---|---|---|---|---|
| CN | 111669428 A | * | 9/2020 | | |
| JP | 2006-11647 A | | 1/2006 | | |
| JP | 2010-273181 A | | 12/2010 | | |
| JP | 2016-170740 | | 9/2016 | | |
| JP | 2016170740 | A * | 9/2016 | ............. | B60R 16/02 |
| JP | WO2014/087613 A1 | | 1/2017 | | |
| JP | 2019-185807 A | | 10/2019 | | |
| JP | 2019191619 | A * | 10/2019 | ............... | G06F 8/65 |
| WO | WO-2020003515 A1 | * | 1/2020 | ............. | G06F 8/433 |

* cited by examiner

FIG.5

| SYSTEM NAME | PROGRAM | UPDATE MEANS | COMBINATION OF PROGRAM VERSIONS | | | | | |
|---|---|---|---|---|---|---|---|---|
| | | | (1) | (2) | (3) | (4) | (5) | (6) |
| IVI | SW-IVI | WIRELESS | 1 | 1 | 1 | 2 | 2 | 2 |
| ENGINE | SW-EG | WIRED | 1 | 2 | 2 | 2 | 2 | 2 |
| GEAR SHIFT DEVICE | SW-SF | WIRED | 1 | 1 | 2 | 2 | 2 | 2 |
| STEERING DEVICE | SW-ST | WIRED | 1 | 1 | 1 | 1 | 2 | 2 |
| METER | SW-MT | WIRED | 1 | 1 | 1 | 1 | 1 | 2 |

FIG.9

| UPDATE | SYSTEM NAME | DOWNLOAD | UPDATE RESULT |
|---|---|---|---|
| ☑ | ENGINE | — | |
| ☑ | GEAR SHIFT DEVICE | — | |
| ■ | IVI | — | |
| ⊠ | STEERING DEVICE | — | |
| ⊠ | METER | — | |

…

CONTROL DEVICE AND TERMINAL DEVICE

INCORPORATION BY REFERENCE

The present application claims priority under 35 U.S.C. § 119 to Japanese Patent Application No. 2021-051920 filed on Mar. 25, 2021. The content of the application is incorporated herein by reference in its entirety.

BACKGROUND OF THE INVENTION

Field of the Invention

The present invention relates to a control device and a terminal device.

Description of the Related Art

Update devices capable of updating programs incorporated in control units controlling the equipment mounted on respective vehicles are conventionally known. These update devices are generally connected by wire to the control units mounted on respective vehicles. However, in recent years, a technique has been proposed in which a vehicle communicates with a server by wireless communication and updates a program of a control unit based on data received from the server (refer to Japanese Patent Laid-Open No. 2016-170740, for example).

With the progress of vehicle control technology, a large number of devices are installed on each vehicle. Therefore, it may be necessary to update the programs of a plurality of control units. However, it is not easy to manage the programs of these control units when a vehicle is equipped with not only control units whose programs are updated by wireless communication but also control units whose programs are updated by wired connection.

In view of the above-described background, the present invention intends to efficiently manage programs of each control unit when two or more control units different in program update method are mounted on a vehicle.

SUMMARY OF THE INVENTION

As a first aspect for attaining the above-described purpose, the present invention provides a control device mounted on a vehicle and configured in such a manner that a program incorporated in a first vehicle control unit can be updated by first updating means and a program incorporated in a second vehicle control unit can be updated by second updating means that is different from the first updating means, the control device including a request reception unit configured to cause the first updating means to receive an acquisition request of acquiring version information about a version of the program of the second vehicle control unit; and a transmission control unit configured to cause the first updating means to transmit the version information according to the acquisition request received by the request reception unit, wherein the first updating means and the second updating means are means for acquiring an update program from a device outside the vehicle, and one of the first updating means and the second updating means acquires a program from a device outside the vehicle via a communication unit provided in the vehicle.

In the above-described control device, the first updating means may be means for acquiring the update program from the device outside the vehicle via the communication unit provided in the vehicle, and the second updating means may be configured to acquire the update program from an external device that is the same as or different from the device outside the vehicle, via a wired connector provided in the vehicle.

In the above-described control device, the request reception unit may be configured to receive the acquisition request that requests activation state information about an activation state of the second vehicle control unit, and the transmission control unit may be configured to transmit the activation state information.

In the above-described control device, the request reception unit may be incorporated in the second vehicle control unit and receive the acquisition request that requests program number information indicating the number of programs to be updated by the second updating means, and the transmission control unit may be configured to transmit the program number information.

In the above-described control device, an update management unit may be provided so as to detect the number of programs installed on the second vehicle control unit to generate the program number information in response to the acquisition request received by the request reception unit, and generate the version information based on the detected number of programs, wherein the transmission control unit may be configured to transmit the program number information and the version information generated by the update management unit.

As a second aspect for attaining the above-described purpose, the present invention provides a terminal device that is communicably connected to a vehicle control unit mounted on a vehicle via a communication cable and controls update of programs of the vehicle control unit, wherein the vehicle control unit includes a first vehicle control unit and a second vehicle control unit, a program incorporated in the first vehicle control unit can be updated by first updating means using the terminal device, and a program incorporated in the second vehicle control unit can be updated by second updating means that is different from the first updating means, the terminal device including a first acquisition unit configured to acquire first version information being information about a version of the program of the first vehicle control unit from the vehicle control unit, a second acquisition unit configured to acquire second version information being information about a version of the program of the second vehicle control unit from the vehicle control unit, and an update program acquisition unit configured to acquire an update program for updating the program of the first vehicle control unit from a first external device based on the first version information and the second version information.

The above-described terminal device may be configured in such a manner that the program incorporated in the second vehicle control unit can be updated by the second updating means using a communication unit provided in the vehicle.

In the above-described terminal device, the second acquisition unit may be configured to acquire activation state information about an activation state of the second vehicle control unit.

In the above-described terminal device, the second acquisition unit may be incorporated in the second vehicle control unit and configured to acquire program number information indicating the number of programs to be updated by the second updating means.

In the above-described terminal device, the update program acquisition unit may be configured to not acquire an update program for a program that is required to be updated after the update of the program of the second vehicle control unit, among programs of the first vehicle control unit, in processing for acquiring the update program for updating the program of the first vehicle control unit.

In the above-described terminal device, a display control unit configured to control the display of a display unit may be provided, and the display control unit may be configured to cause the display unit to display the necessity of updating the program of the second vehicle control unit, when a program that is required to be updated after the update of the program of the second vehicle control unit is included among the programs of the first vehicle control unit.

In the above-described terminal device, the update program acquisition unit may be configured to acquire the update program for updating the program of the second vehicle control unit, and output the acquired update program to a second external device that is different from the first external device.

In the above-described terminal device, the second external device may be portable and physically connected to the second vehicle control unit.

Advantageous Effect of Invention

The above-described configuration enables another device to manage the version of the program of each control unit, when two or more control units different in the means for updating the program are mounted on a vehicle. As a result, the program of each control unit of the vehicle can be efficiently managed.

BRIEF DESCRIPTION OF THE DRAWINGS

FIG. 5 is a schematic diagram illustrating an exemplary configuration of program version designation data;

FIG. 9 is a diagram illustrating an exemplary screen displayed by an update device.

DETAILED DESCRIPTION OF THE PREFERRED EMBODIMENTS

Hereinafter, some embodiments will be described with reference to attached drawings. However, descriptions detailed unnecessarily may be omitted. For example, detailed descriptions for well-known matters or duplicated descriptions for substantially the same configurations may be omitted. This is to prevent the following descriptions from becoming unnecessarily redundant and to facilitate the understanding of those skilled in the art.

It should be noted that the accompanying drawings and the following descriptions are provided for those skilled in the art to fully understand the present disclosure, and are not intended to narrowly limit the subject matter described in the claims.

1. Configuration of Program Update System

Figure 1:
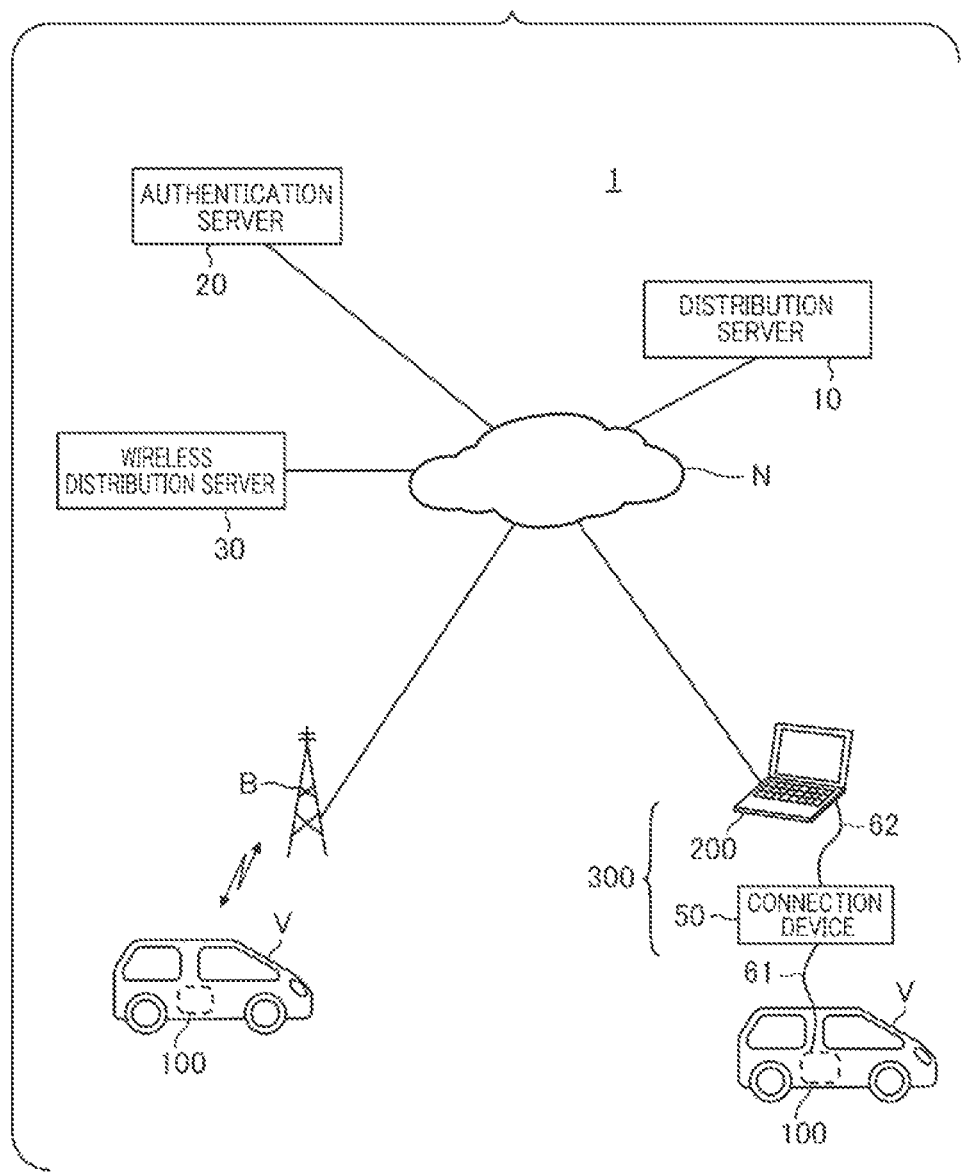
FIG. 1 is a diagram illustrating a schematic configuration of a program update system.

FIG. 1 is a diagram illustrating a schematic configuration of a program update system 1.

The program update system 1 manages the version of each program of an in-vehicle control device 100 mounted on a vehicle V and updates programs.

The program update system 1 includes a distribution server 10, an authentication server 20, and a wireless distribution server 30. The distribution server 10, the authentication server 20, and the wireless distribution server 30 are communicably connected with each other via a communication network N.

The program update system 1 includes a vehicle diagnosing system 300. The vehicle diagnosing system 300 includes a connection device 50 connectable to the in-vehicle control device 100 with wired connection of a cable 61, and an update device 200 connectable to the connection device 50 with a cable 62. The connection device 50 is, for example, a so-called vehicle control interface (VCI). Further, a notebook computer or a desktop computer is available as the update device 200. The update device 200 corresponds to an exemplary terminal device.

Examples of the communication network N include, for example, a cellular communication network, a Wi-Fi (registered trademark) network, a Bluetooth (registered trademark) network, the Internet, a wide area network (WAN), a local area network (LAN), a public telephone line, a provider device, a dedicated line, and a wireless base station. These constituent elements may be configured to directly perform wireless communications without using the communication network N.

The vehicle V is, for example, a two-wheeled vehicle, a three-wheeled vehicle, or a four-wheeled vehicle. A drive source of the vehicle is, for example, an internal combustion engine such as a diesel engine or a gasoline engine, or may be an electric motor or an engine/motor hybrid vehicle. The electric motor operates with electric power generated by a generator connected to an internal combustion engine or electric power discharged from secondary batteries or fuel cells.

In the following description, the program includes at least one program module. The program module includes, for example, one or more programs and can partially execute various functions that can be realized by cooperation of software and hardware. Programs to be rewritten by the program update system 1, that is, programs to be installed on the in-vehicle control device 100, may include data such as parameters and maps that define operations to be realized by the programs and/or data to be processed by the programs. In this respect, the program module can be rephrased as software.

The program update system 1 has first updating means and second updating means, as means for updating the programs of the in-vehicle control device 100.

The first updating means serves as means for updating programs through wired connection of the vehicle diagnosing system 300 to the in-vehicle control device 100.

The update of programs by the first updating means is carried out, for example, at a dealer or a repair shop of the vehicle V. When the vehicle diagnosing system 300 is connected to the in-vehicle control device 100, the vehicle diagnosing system 300 acquires the activation state of an electronic control unit (ECU) configuring the in-vehicle control device 100 and also acquires the version of the program of the ECU. The vehicle diagnosing system 300 requests the distribution server 10 to supply an update program for updating the program of the ECU.

The distribution server 10 manages the version of the program installed on the ECU of the in-vehicle control device 100 in association with a vehicle identification number of the vehicle V. The distribution server 10 receives, from the vehicle diagnosing system 300, data related to the vehicle identification number of the vehicle V, the type of the ECU mounted on the vehicle V, and the version of the program installed on the ECU. The distribution server 10 causes the vehicle diagnosing system 300 to download the update program according to the request of the vehicle diagnosing system 300. The vehicle diagnosing system 300 revises the program installed on the ECU of the in-vehicle control device 100 using the update program downloaded from the distribution server 10. After updating the program of the in-vehicle control device 100, the vehicle diagnosing system 300 transmits the version of the updated program to the distribution server 10, in association with the vehicle identification number of the vehicle V and/or the type of the ECU mounted on the vehicle V. The distribution server 10 manages the program update history of the in-vehicle control device 100 in association with the vehicle identification number. The distribution server 10 is an exemplary device outside the vehicle V and corresponds to a first external device.

The second updating means is means for using a communication function of the in-vehicle control device 100, and is a so-called over-the-air (OTA) program update. As described below, the in-vehicle control device 100 includes a telematics control unit (TCU) 122 that executes cellular communications. The TCU 122 can function as a communication unit (processor, memory, transmitter/receiver, or circuit) provided in the vehicle V. The in-vehicle control device 100 wirelessly communicates with a base station B connected to the communication network N by the TCU 122, and executes the OTA program update. In this case, the in-vehicle control device 100 requests the wireless distribution server 30 to supply an update program. The request transmitted by the in-vehicle control device 100 includes data related to the vehicle identification number of the vehicle V, the type of the ECU mounted on the vehicle V, and the version of the program installed on the ECU.

The wireless distribution server 30 manages the version of each program installed on the ECU of the in-vehicle control device 100 in association with the vehicle identification number of the vehicle V. The wireless distribution server 30 receives, from the in-vehicle control device 100, the data related to the vehicle identification number of the vehicle V, the type of the ECU mounted on the vehicle V, and the version of the program installed on the ECU. The wireless distribution server 30 causes the in-vehicle control device 100 to download the update program according to the request of the in-vehicle control device 100. The in-vehicle control device 100 updates the program of the ECU of the in-vehicle control device 100 based on the update program downloaded from the wireless distribution server 30. After updating the program, the in-vehicle control device 100 transmits the version of the updated program to the wireless distribution server 30, in association with the vehicle identification number of the vehicle V and/or the type of the ECU mounted on the vehicle V. The wireless distribution server 30 manages the program update history of the in-vehicle control device 100 in association with the vehicle identification number. The wireless distribution server 30 is an exemplary device outside the vehicle V.

The wireless distribution server 30 may be the same as or different from the distribution server 10 (first external device). In other words, the program update system 1 may be configured in such a manner that the update program can be acquired from a dedicated program distribution server in each of the first updating means and the second updating means. Alternatively, the program update system 1 may be configured in such a manner that the update program can be acquired from the same distribution server in the first updating means and the second updating means.

The authentication server 20 authenticates the in-vehicle control device 100 or the vehicle diagnosing system 300 prior to the update of the program. The authentication server 20 executes the authentication based on the vehicle identification number of the in-vehicle control device 100 to be updated and key information possessed by the in-vehicle control device 100. When the in-vehicle control device 100 is successfully authenticated, the authentication server 20 permits the in-vehicle control device 100 to access the wireless distribution server 30. Further, when the vehicle diagnosing system 300 is successfully authenticated, the authentication server 20 permits the vehicle diagnosing system 300 to access the distribution server 10.

In the present embodiment, the case where the program update system 1 identifies the individual in-vehicle control device 100 by the vehicle identification number has been exemplified, but the vehicle identification number may be replaced by frame number or any other information capable of identifying the individual vehicle V.

2. Configuration of Devices Included in Program Update System

Figure 2:
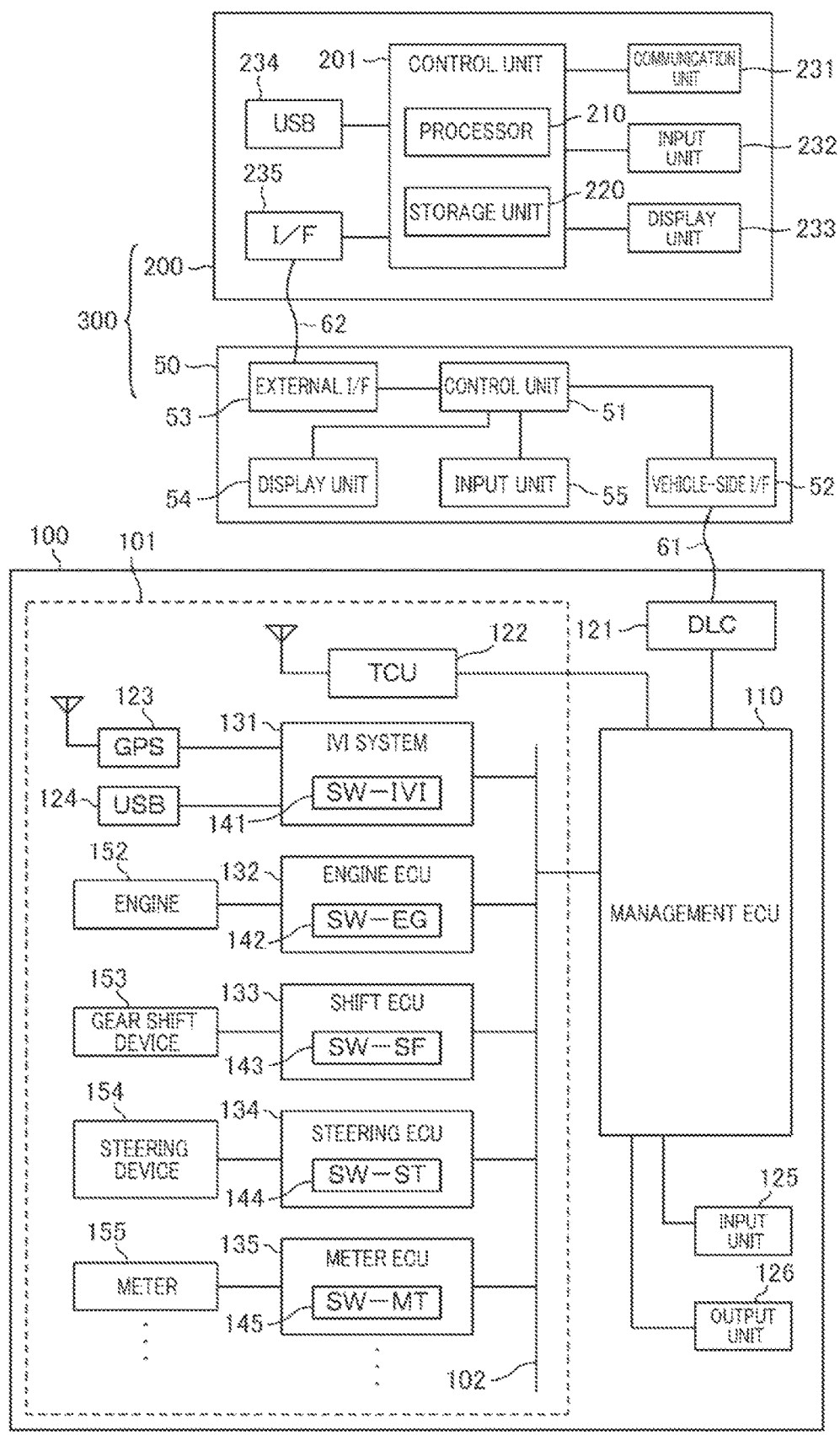
FIG. 2 is a block diagram illustrating an exemplary configuration of an in-vehicle control device and a vehicle diagnosing system.

FIG. 2 is a block diagram illustrating an exemplary configuration of the in-vehicle control device 100 and the vehicle diagnosing system 300.

2-1. Configuration of Vehicle Diagnosing System

The update device 200 includes a control unit 201, a communication unit 231, an input unit 232, a display unit 233, a universal serial bus (USB) connector 234, and an interface 235. The control unit 201 includes a processor 210 configured by a central processing unit (CPU) or the like, and a storage unit (memory) 220 configured to store programs and data to be executed by the processor 210. The control unit 201 controls the update device 200 by causing the processor 210 to execute the programs stored in the storage unit 220.

The communication unit 231 is a communication device (transmitter/receiver, circuit) connected to the communication network N, and communicates with the distribution server 10 and the authentication server 20 under the control of the control unit 201. The input unit 232 has an input device (not illustrated) such as a keyboard, a mouse, a trackpad, or the like. The input unit 232 receives an input to the input device and outputs input data indicating input contents to the control unit 201. The display unit 233 includes a display device (display) (not illustrated) such as a liquid crystal display panel. The display unit 233 causes the display device to display characters and images under the control of the control unit 201. The USB connector 234 is a connector compliant with the USB standard. A memory device 60 or the like, which will be described below, can be connected to the USB connector 234.

The interface 235 includes a connector or an interface circuit to which the cable 62 is connected, and executes data communications with the connection device 50 under the control of the control unit 201. The interface 235 is configured by, for example, a serial communication interface or a USB interface.

The connection device 50 includes a control unit 51, a vehicle-side interface 52, an external interface 53, a display unit 54, and an input unit 55. The control unit 51 includes a processor such as a micro controller unit (MCU) or a micro-processor unit (MPU) and a storage unit (memory) that stores programs and data to be executed by the processor. The control unit 51 controls the connection device 50 by causing the processor to execute programs.

The vehicle-side interface 52 includes a connector or an interface circuit to which the cable 61 is connected, and executes data communications with the in-vehicle control device 100 under the control of the control unit 51. The external interface 53 includes a connector or an interface circuit to which the cable 62 is connected, and executes data communications with the update device 200 under the control of the control unit 51. The display unit 54 includes a display device (display) (not illustrated) such as a liquid crystal display panel or the like. The display unit 54 causes the display device to display characters and images under the control of the control unit 51. The input unit 55 has a plurality of handlers (not illustrated) such as buttons and switches. The input unit 55 detects each operation on the handler and outputs data indicating the detected operation to the control unit 51.

2-2. Configuration of In-Vehicle Control Device

The in-vehicle control device 100 includes a datalink coupler (DLC) 121 that is a connection connector connected to the connection device 50 via the cable 61, an in-vehicle equipment 101, a management ECU 110 that manages individual ECU provided in the vehicle V, an input unit 125 via which information can be input, and an output unit 126 that outputs information.

The input unit 125 is, for example, a touch panel of an in-vehicle infotainment (IVI) system 131 mounted on the vehicle V. The output unit 126 is, for example, an image display device equipped in the IVI system 131 or an image display device provided at a meter equipment portion. Further, the output unit 126 may be provided on an instrument panel of a driver's seat, for example. Specifically, the output unit 126 may be configured as a so-called multi-information display (MID) incorporated in the meter panel. The output unit 126 may be a speaker that outputs sound. Further, the output unit 126 may be a hazard lamp.

The in-vehicle equipment 101 is configured so as to include a plurality of devices mounted on the vehicle V and ECUs that control the same. Examples of the devices provided in the in-vehicle equipment 101 include the TCU 122, a global positioning system (GPS) unit 123, the IVI system 131, an engine 152, a gear shift device 153, a steering device 154, and a meter 155, which are illustrated in FIG. 2.

Further, FIG. 2 illustrates an engine ECU 132 that controls the engine 152, a shift ECU 133 that controls the gear shift device 153, a steering ECU 134 that controls the steering device 154, and a meter ECU 135 that controls the meter 155, which are exemplary ECUs. Each ECU is connected to the management ECU 110 for data communications via a bus 102 serving as a communication path. The bus 102 is, for example, a data communication network of a bus type compliant with the controller area network (CAN).

The devices of the in-vehicle control device 100 and the ECUs controlling these devices illustrated in FIG. 2 are mere examples. The in-vehicle equipment 101 may be configured to include any other devices of the vehicle V and their control ECUs, although not illustrated in FIG. 2. For example, the vehicle V includes a brake device, batteries, a suspension system, an air-bag device, lighting devices, various illumination devices, and their control ECUs.

Specifically, each ECU is a computer that has a processor such as a central processing unit (CPU), a read only memory (ROM) that stores programs, and a random access memory (RAM) that temporary stores data. The above-described controls can be executed by the ECU, which is the computer, by executing the corresponding programs stored in the ROM. In place of or in addition to each of the above-described ECUs, the whole or a part of each of the above-described ECUs may be configured by hardware including one or more electronic circuit components.

SW-EG 142 is a control program installed on the engine ECU 132. SW-SF 143 is a program installed on the shift ECU 133. SW-ST 144 is a program installed on the steering ECU 134. SW-MT 145 is a program installed on the meter ECU 135. The programs SW-EG 142, SW-SF 143, SW-ST 144, and SW-MT 145 are stored in the ROMs of corresponding ECUs and can be updated by the first updating means. That is, the engine ECU 132, the shift ECU 133, the steering ECU 134, and the meter ECU 135 are examples of a first vehicle control unit.

The IVI system 131 is a car navigation system, an audio device, a liquid crystal display, or a head-up display, or may be configured as a plurality of devices. The IVI system 131 includes an ECU capable of realizing functions of the device configuring the IVI system 131 and controlling the IVI system 131, and also includes a control program SW-IVI 141 to be executed by the ECU. That is, the IVI system 131 realizes various functions of the car navigation system and the like based on SW-IVI 141, and also realizes a control function of controlling the equipment configuring the IVI system 131. Therefore, the IVI system 131 is a device that configures various functions of the vehicle V and corresponds to the ECU having the control function. The program SW-IVI 141 is stored in the ROM of the ECU provided in the IVI system 131, and can be updated by the second updating means. That is, the IVI system 131 is an exemplary second vehicle control unit.

The GPS unit 123 for positioning the vehicle V is connected to the IVI system 131. The IVI system 131 acquires positional information from the GPS unit 123, for example, in the operation of the car navigation system. Further, a USB connector 124 is connected to the IVI system 131. The USB connector 124 is a connector compliant with the USB standard, and is usable for connection of the memory device 60 or the like. The memory device 60 is a portable storage device compliant with the USB standard, and includes a rewritable semiconductor memory element such as a flash ROM. The memory device 60 is connectable to the USB connector 124 and the USB connector 234. In the state where the memory device 60 is connected to the USB connector 234, the update device 200 can write or delete programs and data into or from the memory device 60 and can format them. Further, in the state where the memory device 60 is connected to the USB connector 124, the IVI system 131 can read programs and data from the memory device 60. The memory device 60 is an exemplary second external device.

The management ECU 110 communicates with each ECU via the bus 102, and monitors the activation state or operation state of each ECU.

Each ECU configuring the in-vehicle equipment 101 has a fault diagnosis function of diagnosing the operation of the ECU and the state of each sensor. The management ECU 110 acquires, via the bus 102, information about any failure or malfunction detected by the ECU of the in-vehicle equipment 101 using the fault diagnosis function. That is, the management ECU 110 functions as an on-board diagnostics (OBD).

2-3. Configuration of Control System

Figure 3:
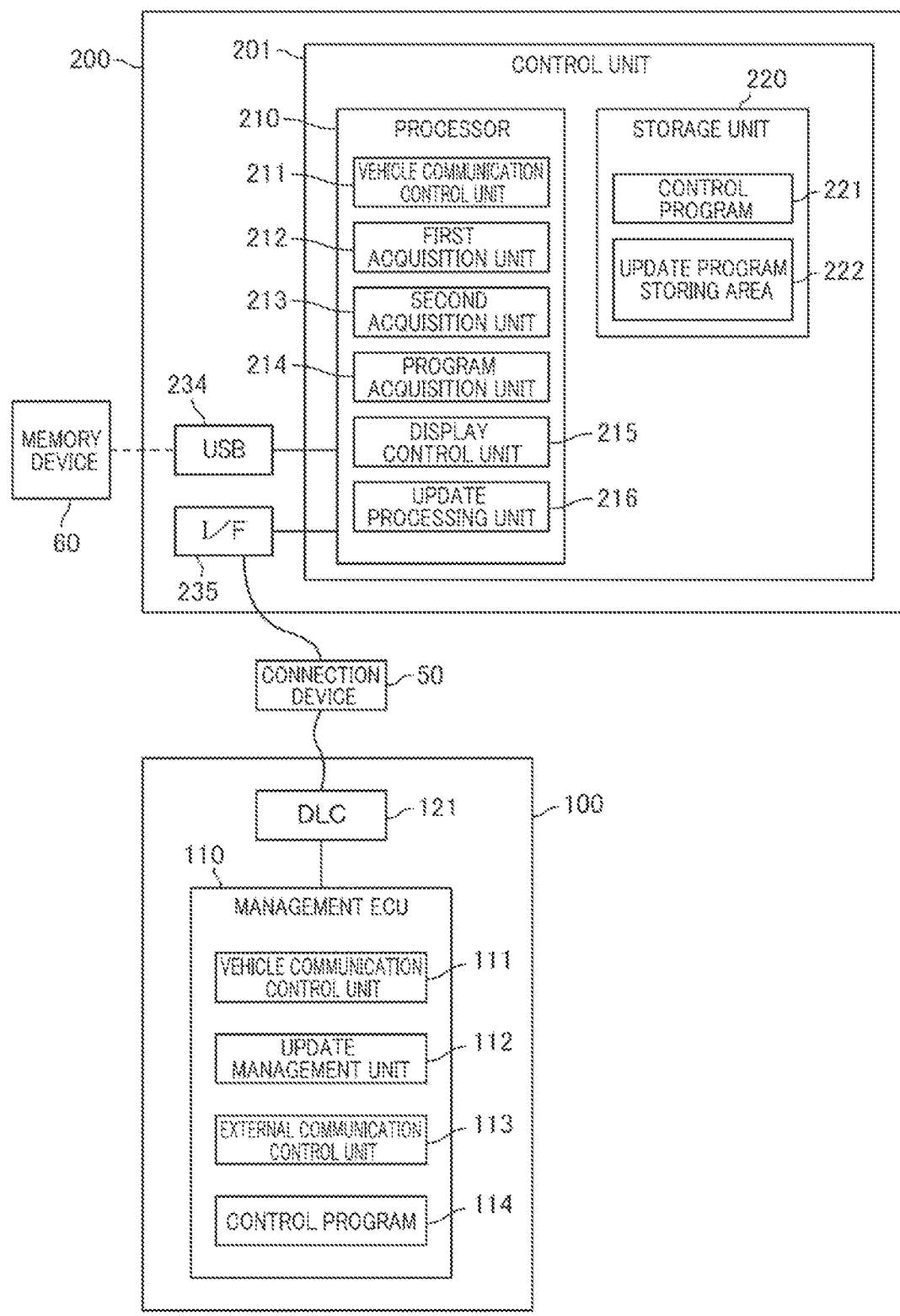
FIG. 3 is a functional block diagram illustrating a control system including the in-vehicle control device and the vehicle diagnosing system.

FIG. 3 is a functional block diagram illustrating a control system including the update device 200 and the in-vehicle control device 100.

The management ECU 110 includes a control program 114, which is a program to be executed by the processor of the management ECU 110. By executing the control program 114, the management ECU 110 configures a vehicle communication control unit 111, an update management unit 112, and an external communication control unit 113.

The vehicle communication control unit 111 communicates with each ECU configuring the in-vehicle control device 100 via the bus 102. The update management unit 112 manages acquisition of the version of each program, execution of the OTA program update, and program update history for the ECU to which the second updating means is applied.

The external communication control unit 113 communicates with the vehicle diagnosing system 300 via the DLC 121. When the vehicle diagnosing system 300 is connected to the DLC 121, the external communication control unit 113 enables the vehicle diagnosing system 300 to communicate with each ECU of the in-vehicle control device 100. Specifically, when the vehicle diagnosing system 300 requests acquiring program version information of the ECU, the external communication control unit 113 receives this acquisition request. In response to the acquisition request, the external communication control unit 113 transmits version information indicating the version of the program of the ECU to the vehicle diagnosing system 300. The external communication control unit 113 is an exemplary request reception unit and an exemplary transmission control unit.

The update device 200 stores a control program 221 in the storage unit 220. By executing the control program 221 with the processor 210, the update device 200 configures a vehicle communication control unit 211, a first acquisition unit 212, a second acquisition unit 213, a program acquisition unit 214, a display control unit 215, and an update processing unit 216.

The vehicle communication control unit 211 communicates with the in-vehicle control device 100 via the interface 235 and the connection device 50. The first acquisition unit 212 requests the in-vehicle control device 100 to acquire first version information indicating the version of the program, for the ECU whose program can be updated by the first updating means, of the ECUs provided in the in-vehicle control device 100. The first acquisition unit 212 acquires the first version information transmitted by the in-vehicle control device 100 in response to the request. For example, the first acquisition unit 212 acquires the first version information indicating versions of programs of the engine ECU 132, the shift ECU 133, the steering ECU 134, and the meter ECU 135.

The second acquisition unit 213 requests the in-vehicle control device 100 to acquire second version information indicating the version of the program, for the ECU whose program can be updated by the second updating means, of the ECUs provided in the in-vehicle control device 100. The second acquisition unit 213 acquires the second version information transmitted by the in-vehicle control device 100 in response to the request. For example, the second acquisition unit 213 acquires the second version information indicating the version of the program of the IVI system 131. When two or more ECUs are included in the IVI system 131, the second version information includes information indicating a plurality of program versions possessed by the IVI system 131.

The program acquisition unit 214 requests the distribution server 10 to supply an update program, and downloads the update program. The program acquisition unit 214 stores the downloaded program in an update program storing area 222 formed in the storage unit 220. The program acquisition unit 214 is an exemplary update program acquisition unit.

The display control unit 215 causes the display unit 233 to display a screen related to operations of the vehicle communication control unit 211, the first acquisition unit 212, the second acquisition unit 213, and the program acquisition unit 214.

Using the update program stored in the update program storing area 222, the update processing unit 216 executes the update of the program for the ECU whose program can be updated by the first updating means.

3. Update Order of Program

Figure 4:
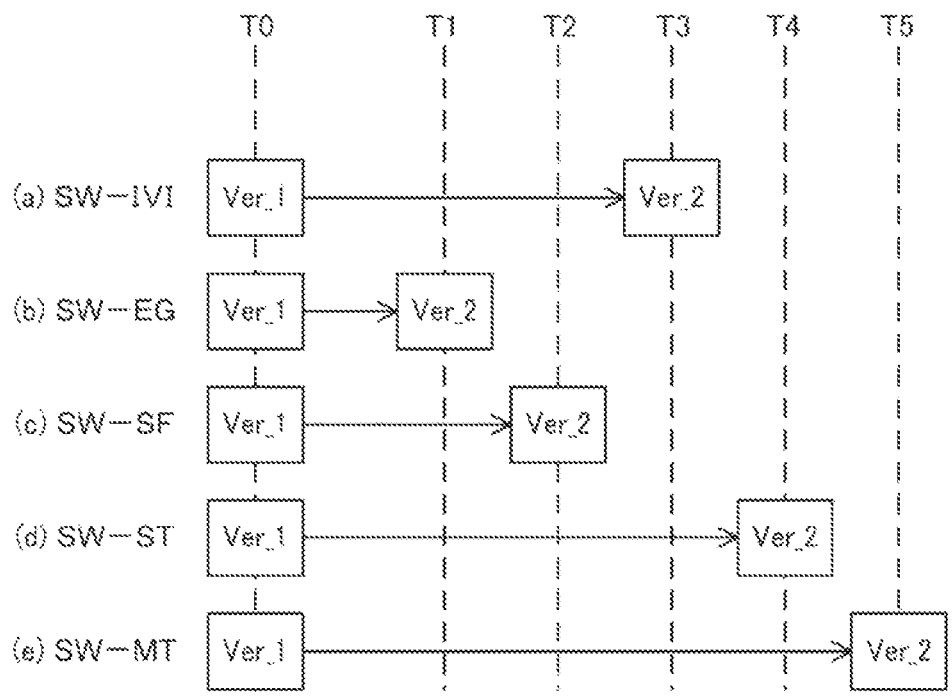
FIG. 4 is a schematic diagram illustrating an exemplary update order of programs.

FIG. 4 is a schematic diagram illustrating an exemplary update order of programs.

The programs installed on the ECUs of the in-vehicle control device 100 are occasionally updated for the purpose of improving the functions and solving the malfunctions, and a new version of each program is provided. The time when a new version of the program is released is not always fixed. When the in-vehicle control device 100 is equipped with a plurality of ECUs, the time at which a new version of the program is released may differ for each ECU program.

FIG. 4 exemplarily illustrates a case in which the programs SW-IVI 141, SW-EG 142, SW-SF 143, SW-ST 144, and SW-MT 145 are updated from version 1 (Ver_1) to version 2 (Ver_2). The abscissa axis represents the passage of time, with T0, T1, T2, T3, T4, and T5 each indicating the time (for example, date) when each program is released. In FIG. 4, (a) indicates the transition of the version of SW-IVI 141, (b) indicates the transition of the version of SW-EG 142, (c) indicates the transition of the version of SW-SF 143, (d) indicates the transition of the version of SW-ST 144, and (e) indicates the transition of the version of SW-MT 145. Version 1 is the version of the program in the initial state, and version 2 is the version of the updated program.

At the shipment time T0 of the vehicle V, the programs SW-IVI 141, SW-EG 142, SW-SF 143, SW-ST 144, and SW-MT 145 are all version 1.

In the example described below, the release of SW-EG 142 (Ver_2) starts at time T1. Subsequently, the release of SW-SF 143 (Ver_2) starts at time T2, the release of SW-IVI 141 (Ver_2) starts at time T3. Further, the release of SW-ST 144 (Ver_2) starts at time T4, and the release of SW-MT 145 (Ver_2) starts at time T5.

The program update system 1 updates the program of the in-vehicle control device 100 according to the release start order illustrated in FIG. 4. In other words, updating the program of the in-vehicle control device 100 according to the order not complying with the release start order illustrated in FIG. 4 is restricted. For example, the release start of SW-EG 142 (Ver. 2) precedes that of the SW-SF 143 (Ver. 2). Therefore, the processing for updating SW-SF 143 to version 2 thereof is permitted if updating SW-EG 142 to version 2 thereof is completed. And, it is restricted to update these programs according to the opposite order.

The distribution server 10 and/or the wireless distribution server 30 have data for managing the program update for the in-vehicle control device 100. Specifically, the distribution server 10 and/or the wireless distribution server 30 have data indicating acceptable combinations with respect to the version combination of the plurality of ECUs provided in the in-vehicle control device 100. Examples of such data are illustrated in FIG. 5.

FIG. 5 is a schematic diagram illustrating an exemplary configuration of program version designation data 40.

The program version designation data 40 is data indicating combinations of programs when the example of FIG. 4 is implemented as acceptable combinations among the version combinations of the ECUs provided in the in-vehicle control device 100.

In the example illustrated in FIG. 5, the program version designation data 40 includes system name, which is the name of each ECU on which the program is installed, and the program installed on each ECU, while associating them with each other. The program version designation data 40 may include data indicating means for updating the program of each ECU, as illustrated in FIG. 5. According to the example illustrated in FIG. 5, "wired" indicates the program update using the vehicle diagnosing system 300 and refers to the first updating means. On the other hand, "wireless" indicates the OTA program update, and refers to the second updating means.

The program version designation data 40 defines acceptable combinations with respect to the program version in association with system name and program. According to the example illustrated in FIG. 5, combination (1) is a combination in which SW-IVI 141, SW-EG 142, SW-SF 143, SW-ST 144 and SW-MT 145 are all version 1. Next, combination (2) is a combination in which SW-EG 142 is version 2 and other programs are version 1. The combination of versions defined in the program version designation data 40 is determined according to the release start order of new versions of the programs of respective ECUs.

When the vehicle diagnosing system 300 requests an update program, the distribution server 10 causes the vehicle diagnosing system 300 to download the update program according to the order in which the combination matches the program version designation data 40. Further, if the vehicle diagnosing system 300 requests an update program that does not match the program version designation data 40, the distribution server 10 does not permit the download of the update program. Therefore, it is possible to prevent the update of the program that causes an acceptable combination, and therefore the burden on an operator who manipulates the update device 200 can be reduced.

Further, according to the program update system 1 of the present embodiment, the vehicle diagnosing system 300 is enabled to download the program of the IVI system 131 to be updated using the OTA program update, that is, SW-IVI 141.

SW-IVI 141 is a program that the in-vehicle control device 100 downloads from the vehicle diagnosing system 300 by the TCU 122 and is updated under the control of the management ECU 110. As a modification of the OTA program update, when the memory device 60 storing the update program of SW-IVI 141 is physically connected to the USB connector 124, the management ECU 110 can update SW-IVI 141 using the update program in the memory device 60. In order to use this function, the vehicle diagnosing system 300 has a function of acquiring an update program from the distribution server 10 and writing it into the memory device 60. As a result, under the management of the vehicle diagnosing system 300, the program including SW-IVI 141 can be updated. The update program written in the memory device 60 is applicable only to the vehicle V, and the term of validity is set for the update program written in the memory device 60. The term of validity is, for example, within 24 hours. As a result, the program stored in the memory device 60 is installable only on a specific vehicle V. Therefore, individually managing the program is feasible and the occurrence of a software configuration of incorrect vehicle and/or incorrect time can be prevented. In addition, the software configuration may change depending on the elapsed time. For example, new programs may be distributed due to the occurrence of new design changes, and software combinations may change. From the viewpoint of handling such situations, it is preferable not to use a tool created before a certain period of time in the past, and it is useful to set the term of validity for each update program written in the memory device 60.

4. Operation of Program Update System

Figure 6:
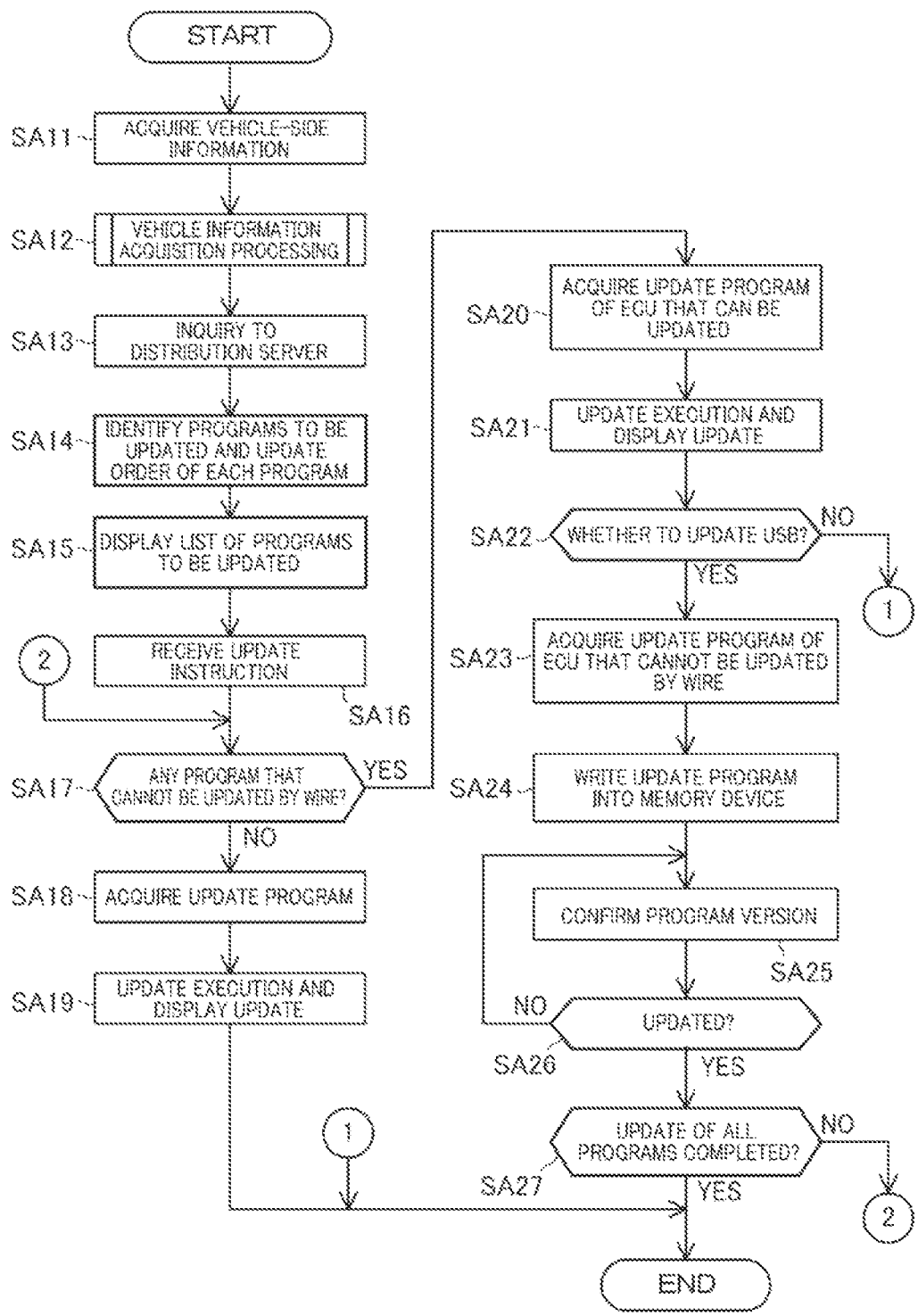
FIG. 6 is a flowchart illustrating an exemplary operation of the program update system.

FIG. 6 is a flowchart illustrating an exemplary operation of the program update system 1, which is performed by the update device 200.

Figure 7:
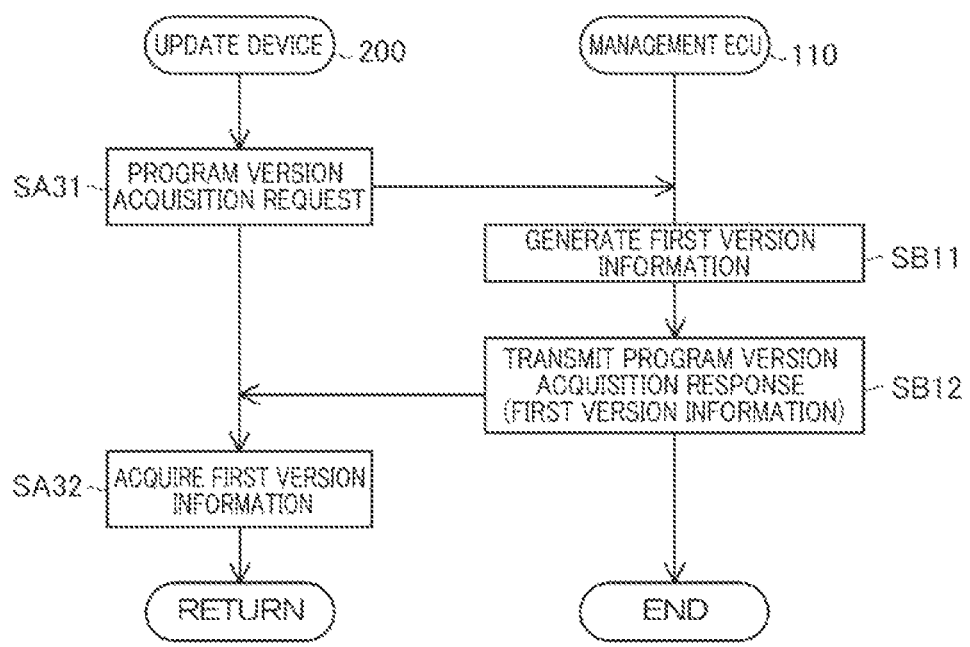
FIG. 7 is a sequence diagram illustrating an exemplary operation of the program update system.
Figure 8:
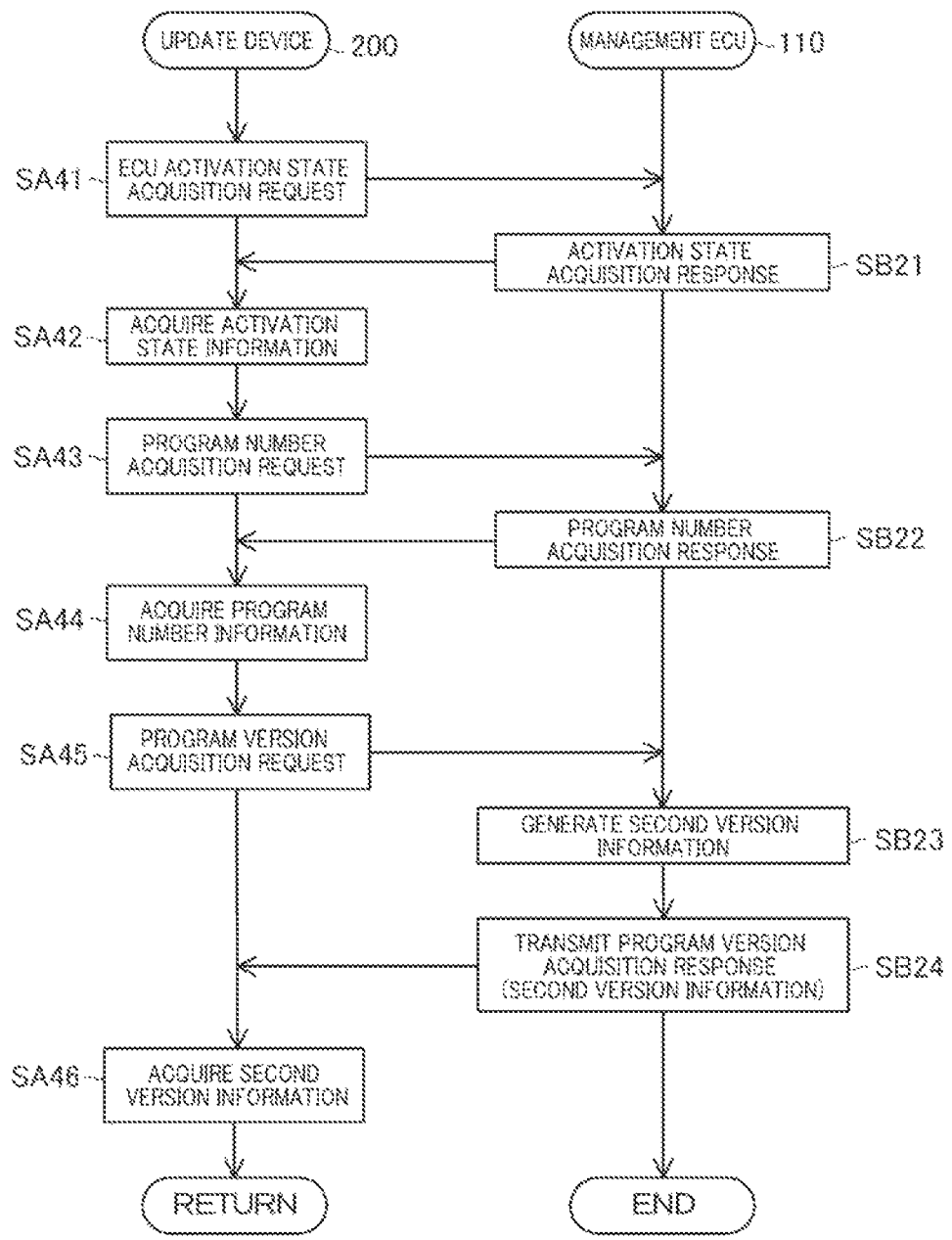
FIG. 8 is a sequence diagram illustrating an exemplary operation of the program update system.

Each of FIGS. 7 and 8 is a sequence diagram illustrating the operation of the program update system 1, more specifically, exemplary operations of the update device 200 and the in-vehicle control device 100 in step SA12 (FIG. 6). Further, FIG. 9 is a diagram illustrating an exemplary screen displayed by the update device 200.

The operation of the program update system 1 will be described with reference to these drawings. The in-vehicle control device 100 that executes the operation described below functions as a control device. It can also be said that this function is executed by the management ECU 110 as an exemplary control device.

The processing of FIG. 6 is executed after the vehicle diagnosing system 300 is connected to the in-vehicle control device 100. In step SA11, the update device 200 communicates with the in-vehicle control device 100 and acquires information about the in-vehicle control device 100. In step SA11, the update device 200 acquires information such as the number of ECUs provided in the in-vehicle equipment 101, the name of each ECU, the name of each control object device, and program updating means of the ECU. Further, in step SA11, the update device 200 may acquire the vehicle identification number and/or the frame number of the vehicle V.

More specifically, in step SA11, the update device 200 controls the connection device 50 so as to transmit an information request command to the management ECU 110, and causes the connection device 50 to receive data that the management ECU 110 transmits as a response to this command. The update device 200 acquires, from the connection device 50, the data transmitted by the management ECU 110. The communication between the update device 200 and the in-vehicle control device 100 described below is similar to step SA11 in that a command is input to the management ECU 110 and the management ECU 110 outputs a response.

In step SA12, through communication with the in-vehicle control device 100, the update device 200 executes vehicle information acquisition processing for acquiring information about each ECU program possessed by the in-vehicle control device 100.

An example of the processing performed in step SA12 is illustrated in detail in FIG. 7. The processing of FIG. 7 is executed in cooperation between the first acquisition unit 212 of the update device 200 and the in-vehicle control device 100.

In step SA31, the update device 200 transmits a program version acquisition request to the management ECU 110. The request transmitted by the update device 200 in step SA31 includes information specifying an objective ECU among the ECU provided in the in-vehicle control device 100.

If the management ECU 110 receives the program version acquisition request, then in step SB11, the management ECU 110 acquires the program version of the request object ECU and generates first version information indicating the version of the program. Next, in step SB12, the management ECU 110 transmits a program version acquisition response including the first version information to the update device 200.

In step SA32, the update device 200 acquires the first version information transmitted by the management ECU 110.

The processing of FIG. 7 is executed for each ECU provided in the in-vehicle equipment 101. For example, when the in-vehicle equipment 101 includes four ECUs each having the program to be updated under the control of the update device 200, the update device 200 executes the processing of FIG. 7 for each of four ECUs.

Further, in the processing of FIG. 7, the update device 200 may cause the connection device 50 to transmit a command to the ECU of the in-vehicle equipment 101. For example, the update device 200 may transmit a command to the engine ECU 132 serving as a destination. In this case, the management ECU 110 transfers the command input from the connection device 50 to the engine ECU 132. The engine ECU 132 generates and transmits first version information, as a response to the acquisition request in step SA31. The management ECU 110 outputs the first version information transmitted from the engine ECU 132 to the connection device 50. That is, the engine ECU 132 executes the processing of steps SB11 and SB12 in FIG. 7. Such an operation is effective when the update device 200 has information that can identify the ECU provided in the in-vehicle equipment 101.

The processing of FIG. 7 is effective for the ECU that updates the program by the first updating means using the vehicle diagnosing system 300. On the other hand, the ECU that updates the program by the second updating means may not have the specifications capable of responding to the acquisition request command transmitted by the update device 200. Accordingly, for the ECU that updates the program by the second updating means, in step SA12, the update device 200 performs processing different from that of FIG. 7.

FIG. 8 illustrates another example of the processing performed in step SA12. The processing of FIG. 8 is executed in cooperation between the second acquisition unit 213 of the update device 200 and the in-vehicle control device 100.

In step SA41, the update device 200 designates an objective system and transmits an ECU activation state acquisition request to the management ECU 110. The object system refers to an ECU control object or the ECU, and is the IVI system 131 in the present embodiment.

If the management ECU 110 receives the activation state acquisition request, then in step SB21, the management ECU 110 transmits a response including activation state information indicating the activation state of the ECU configuring the objective system to the update device 200. The activation state information is, for example, information indicating, for each ECU, whether the whole or a part of the ECUs of the IVI system 131 is activated or in a power saving state.

In step SA42, the update device 200 acquires the activation state information. Here, if there is an ECU that has not been started, the startup of this ECU reflects that the update device 200 has transmitted the acquisition request in step SA41. Since there is a possibility that the response regarding the program version cannot be made immediately after the startup of the ECU, it is preferable that the update device 200 waits for a predetermined time after completing the processing of step SA42.

In step SA43, the update device 200 transmits a program number acquisition request of programs installed on the objective system. The program number indicates the number of programs installed on the objective system, that is, the IVI system 131. If the management ECU 110 receives the program number acquisition request, then in step SB22, the management ECU 110 transmits, to the update device 200, a response including program number information indicating the number of programs installed on the objective system.

In step SA44, the update device 200 acquires the program number information. In step SA45, the update device 200 transmits a program version acquisition request. The request transmitted by the update device 200 in step SA45 is for requesting the version of each program installed on the objective system. If the management ECU 110 receives the program version acquisition request, then in step SB23, the management ECU 110 acquires version of the program installed on the objective system and generates second version information indicating the version of the program. In step SB24, the management ECU 110 transmits a program version acquisition response including the second version information to the update device 200. Then, in step SA46, the update device 200 acquires the second version information transmitted from the management ECU 110.

The second version information includes the version of each program installed on the objective system. For example, this information has the format in which information indicating versions of a plurality of programs of the objective system is arranged. The update device 200 can identify the version of each program installed on the objective system by cutting out the version information included in the second version information, based on the program number information acquired in step SA44.

In the processing of FIG. 8, the update device 200 may cause the connection device 50 to transmit a command to the objective system of the in-vehicle equipment 101, that is, the IVI system 131. In this case, the management ECU 110 transfers the command input from the connection device 50 to the IVI system 131. The IVI system 131 generates and transmits activation state information, program number information, and second version information, as a response to the acquisition request command.

Through the processing of FIG. 7 or FIG. 8, the update device 200 acquires the version of each program installed on the in-vehicle equipment 101.

Returning to FIG. 6, in step SA13, the update device 200 transmits an inquiry to the distribution server 10 based on the version of each program acquired in step SA12. Specifically, in step SA13, the update device 200 inquires of the distribution server 10 about the presence of any program to be updated among the programs of the vehicle V.

In step SA14, the update device 200 identifies a program or programs to be updated in the vehicle V and the update order of each program, as a result of the inquiry in step SA13, based on the information transmitted from the distribution server 10. The program to be updated is a program whose update is required or recommended because of the release of a new version of the program. In step SA15, the update device 200 causes the display unit 233 to display a list of programs to be updated.

FIG. 9 illustrates an exemplary configuration of an update management screen 401 displayed by the update device 200. The update management screen 401 is an exemplary screen for displaying the list of programs to be updated.

The update management screen 401 includes an update propriety display part 411, a system name display part 412, a download state display part 413, and an update result display part 414.

The system name of the ECU having a program to be updated is displayed in the system name display part 412. The update propriety display part 411 includes checkboxes each instructing the update of each program of the ECU displayed in the system name display part 412. According to the example illustrated in FIG. 9, the IVI system 131 is included in the ECU to be updated. Since the IVI system 131 is not an object whose program is to be updated by the vehicle diagnosing system 300, the checkbox corresponding to the IVI system 131 is displayed in black so that the check operation is unfeasible.

Further, the programs of the steering ECU 134 and the meter ECU 135 can be updated only after the completion of the update of the IVI system 131. Therefore, in the update propriety display part 411, checkboxes corresponding to the steering ECU 134 and the meter ECU 135 are grayed out to indicate that the check operation is unfeasible.

When downloading an update program from the distribution server 10, the progress of the downloading is displayed in the download state display part 413. Program update processing results are displayed in the update result display part 414.

After being displayed in step SA15 in FIG. 6, the update management screen 401 is continuously displayed until the program update is completed. The contents displayed in the download state display part 413 and the update result display part 414 are occasionally updated.

The update management screen 401 enables an operator manipulating the update device 200 to know the order of updating the programs of the vehicle V and the presence of any program that cannot be updated by the update device 200.

Returning to FIG. 6, in step SA16, the update device 200 receives an update instruction. The update instruction is, for example, an operation of checking a checkbox in the update propriety display part 411. After the reception of the update instruction, in step SA17, the update device 200 determines whether there is any program that cannot be updated by the vehicle diagnosing system 300 among the programs to be updated identified in step SA14. In the example illustrated in FIG. 9, the program of the IVI system 131 corresponds to this.

If it is determined that there is no program that cannot be updated by the vehicle diagnosing system 300 (NO in step SA17), then in step SA18, the update device 200 acquires update programs corresponding to the programs to be updated from the distribution server 10. In step SA19, the update device 200 updates the programs of the in-vehicle equipment 101 by using the acquired update programs and updates the display of the update management screen 401 during the program update. After the program update has been completed, the update device 200 terminates the present processing.

If it is determined that there is a program that cannot be updated by the vehicle diagnosing system 300 (YES in step SA17), then in step SA20, the update device 200 does not update the corresponding program and acquires an update program from the distribution server 10 for an update program that can be updated. According to the example illustrated in FIG. 9, the programs of the engine ECU 132 and the shift ECU 133 are programs that can be updated. In this case, in step SA20, the update device 200 downloads update programs of the engine ECU 132 and the shift ECU 133.

Next, in step SA21, the update device 200 updates the programs of the in-vehicle equipment 101 by using the acquired update programs, and updates the display of the update management screen 401 during the program update.

Here, in step SA22, the update device 200 determines whether to update the program using the memory device 60. For example, the update device 200 causes the display unit 233 to display a screen that enables the operator to input an intent to perform the program update using the memory device 60. The operation on this screen is received by the input unit 232, and the determination is made based on the operation.

When if it is determined that the program update using the memory device 60 is not performed (NO in step SA22), the update device 200 terminates the present processing. In this case, the program of the IVI system 131 is not updated. However, for example, the program of the IVI system 131 can be updated by the OTA program update using the TCU 122. Therefore, after completion of the program update for the IVI system 131, the vehicle diagnosing system 300 is connected again to the in-vehicle control device 100 to perform the processing of step SA11 and the following steps, so that the program update for the in-vehicle control device 100 can be completed.

Further, if it is determined to perform the program update using the memory device 60 (YES in step SA22), then in step SA23, the update device 200 acquires an update program corresponding to the ECU that cannot be updated by wire, that is, the ECU identified in step SA17, from the distribution server 10. In step SA24, the update device 200 writes the update program acquired from the distribution server 10 in step SA23 into the memory device 60 connected to the USB connector 234.

Here, the operator manipulating the update device 200 removes the memory device 60 from the USB connector 234 and connects it to the USB connector 124. The management ECU 110 reads the update program from the USB connector 124 via the IVI system 131, and updates the program of the IVI system 131. Upon completion of the program update, the version of the program of the IVI system 131 is changed.

After the removal of the memory device 60 from the USB connector 234, in step SA25, the update device 200 communicates with the in-vehicle control device 100 to confirm the program version of the IVI system 131. For example, in step SA25, the update device 200 performs an operation similar to that of FIG. 8 to confirm the program version by acquiring the second version information.

In step SA26, the update device 200 determines whether the program has been updated by using the update program written in the memory device 60, based on the program version confirmed in step SA25. If it is determined that the program is not yet updated (NO in step SA26), the update device 200 repeats the processing of step SA25.

If it is determined that the program has been updated (YES in step SA26), then in step SA27, the update device 200 determines whether the update of all the programs to be updated has been completed. When there is any program that is not yet updated (NO in step SA27), the processing returns to step SA17 in which the update device 200 repeats the above-described processing.

5. Other Embodiments

The above-described embodiments are mere examples to which the present invention is applied, and it is not intended to narrowly limit the present invention by these embodiments.

The configuration of the in-vehicle equipment 101 illustrated in the above embodiment is an example, and each ECU provided in the in-vehicle equipment 101 is not limited in type. The number of ECUs and the configuration of each control object device of the ECUs can be variously changed. The ECU whose program is updated by the second updating means is not limited to the IVI system 131, and may include the engine ECU 132, the shift ECU 133, the steering ECU 134, and the meter ECU 135, for example, as illustrated in the above embodiment.

Further, there is no restriction on the mode of communication between the vehicle diagnosing system 300 and the in-vehicle control device 100. For example, the update device 200 may be configured to wirelessly communicate with the in-vehicle control device 100.

Further, the distribution server 10, the authentication server 20, and the wireless distribution server 30 may be configured by a single server computer or may be configured by two or more server computers for distributed processing, or may be configured by a cloud server.

Schematic drawings of FIGS. 2 and 3 distinctively illustrate functional configurations of respective devices provided in the program update system 1 according to main processing contents in order to facilitate the understanding of the present invention, and do not intend to narrowly limit the configuration of each device. For example, in the update device 200, processing of the constituent elements provided in the processor 210 may be executed by a single hardware unit or may be executed by two or more hardware units. The same applies to the in-vehicle control device 100. Further, the processing illustrated in FIG. 6 to FIG. 8 may be executed by a single program or may be executed by two or more programs.

The control program 221 can also be realized in a state where the control program 221 is recorded on a portable information recording medium. Examples of the information recording medium include magnetic recording media such as hard disks, optical recording media such as compact discs (CDs), and semiconductor storage devices such as universal serial bus (USB) memories and solid state drives (SSDs). It is needless to say that other appropriate recording medium is usable. The processor 210 may read the control program 221 from the information recording medium and execute it.

6. Configuration Supported by the Above Embodiments

The above embodiments support the following configurations.
Configuration 1
A control device mounted on a vehicle and configured in such a manner that a program incorporated in a first vehicle control unit can be updated by first updating means and a program incorporated in a second vehicle control unit can be updated by second updating means that is different from the first updating means, the control device including a request reception unit configured to cause the first updating means to receive an acquisition request of acquiring version information about a version of the program of the second vehicle control unit; and a transmission control unit configured to cause the first updating means to transmit the version information according to the acquisition request received by the request reception unit, wherein the first updating means and the second updating means are means for acquiring an update program from a device outside the vehicle, and one of the first updating means and the second updating means acquires a program from a device outside the vehicle via a communication unit provided in the vehicle.

The control device of the configuration 1 enables another device to manage the version of the program of each control unit, when two or more control units different in the means for updating the program are mounted on a vehicle. As a result, the program of each vehicle control unit can be efficiently managed.
Configuration 2

The control device according to the configuration 1, in which the first updating means is means for acquiring the update program from the device outside the vehicle via the communication unit provided in the vehicle, and the second updating means acquires the update program from an external device that is the same as or different from the device outside the vehicle, via a wired connector provided in the vehicle.

The control device of the configuration 2 can efficiently manage the program of each control unit of the vehicle that includes the control unit configured to acquire update programs via the communication unit and the control unit configured to acquire update programs via the wired connector.
Configuration 3

The control device according to the configuration 1 or 2, in which the request reception unit receives the acquisition request that requests activation state information about an activation state of the second vehicle control unit, and the transmission control unit transmits the activation state information.

The control device of the configuration 3 enables another device to manage the activation state of a vehicle control unit. Therefore, for example, it is possible to communicate with the vehicle control unit correspondingly to the activation state of the vehicle control unit. The state of the control unit can be efficiently managed.
Configuration 4

The control device according to the configuration 1 or 2, in which the request reception unit is incorporated in the second vehicle control unit and receives the acquisition request that requests program number information indicating the number of programs to be updated by the second updating means, and the transmission control unit transmits the program number information.

The control device of the configuration 4 enables another device to manage the means for updating the programs of the control unit and the number of programs to be updated by this means.
Configuration 5

The control device according to the configuration 4, further including an update management unit configured to detect the number of programs installed on the second vehicle control unit to generate the program number information in response to the acquisition request received by the request reception unit, and generate the version information based on the detected number of programs, wherein the transmission control unit transmits the program number information and the version information generated by the update management unit.

The control device of the configuration 5 enables another device to manage the programs of the control unit with respect to the number of programs and the version of each program. Therefore, the management of the programs of the control unit can be made more efficient.

Configuration 6

A terminal device that is communicably connected to a vehicle control unit mounted on a vehicle via a communication cable and controls update of programs of the vehicle control unit, wherein the vehicle control unit includes a first vehicle control unit and a second vehicle control unit, a program incorporated in the first vehicle control unit can be updated by first updating means using the terminal device, and a program incorporated in the second vehicle control unit can be updated by second updating means that is different from the first updating means, the terminal device including a first acquisition unit configured to acquire first version information being information about a version of the program of the first vehicle control unit from the vehicle control unit, a second acquisition unit configured to acquire second version information being information about a version of the program of the second vehicle control unit from the vehicle control unit, and an update program acquisition unit configured to acquire an update program for updating the program of the first vehicle control unit from a first external device based on the first version information and the second version information.

According to the configuration 6, the terminal device connected to a vehicle via a cable can manage programs, for each updating means, when there are two or more control units different in the means for updating the program. Therefore, the management of the programs of the vehicle control unit can be made more efficient.

Configuration 7

The terminal device according to the configuration 6, wherein the program incorporated in the second vehicle control unit can be updated by the second updating means using a communication unit provided in the vehicle.

According to the configuration 7, the terminal device connected to the vehicle via a cable can manage the version of each program, for each means for updating programs, in the configuration in which programs incorporated in the vehicle control unit can be updated by the communication unit of the vehicle. As a result, the terminal device that updates the programs can manage each program to be updated by the means that does not depend on the terminal device. Therefore, the management of the programs can be further made more efficient.

Configuration 8

The terminal device according to the configuration 6 or configuration 7, in which the second acquisition unit acquires activation state information about an activation state of the second vehicle control unit.

According to the configuration 8, the terminal device that updates the programs of the vehicle can manage the activation state of the control unit whose program is updated by the means that does not depend on the terminal device. Therefore, the management of the programs can be further made more efficient.

Configuration 9

The terminal device according to any one of the configurations 6 to 8, in which the second acquisition unit is incorporated in the second vehicle control unit and acquires program number information indicating the number of programs to be updated by the second updating means.

According to the configuration 9, the terminal device that updates the program of the vehicle can manage the number of programs of the control unit whose program is updated by the means that does not depend on the terminal device. Therefore, the management of the programs can be further made more efficient.

Configuration 10

The terminal device according to any one of the configurations 6 to 9, in which the update program acquisition unit does not acquire an update program for a program that is required to be updated after the update of the program of the second vehicle control unit, among programs of the first vehicle control unit, in processing for acquiring the update program for updating the program of the first vehicle control unit.

The terminal device of the configuration 10 can prevent an error occurring the order of updating the programs. Therefore, the program update can be appropriately managed.

Configuration 11

The terminal device according to the configuration 10, in which a display control unit configured to control the display of a display unit is provided, and the display control unit causes the display unit to display the necessity of updating the program of the second vehicle control unit, when a program that is required to be updated after the update of the program of the second vehicle control unit is included among the programs of the first vehicle control unit.

The terminal device of the configuration 11 can make an operator working for the program update comply with restrictions related to the program update order by notifying them.

Configuration 12

The terminal device according to any one of the configurations 6 to 11, in which the update program acquisition unit acquires the update program for updating the program of the second vehicle control unit, and outputs the acquired update program to a second external device that is different from the first external device.

According to the configuration 12, since the terminal device that updates the program of the vehicle acquires the program to be updated by the means that does not depend on the terminal device and outputs the acquired program to the second external device, the update of the program using the second external device can be realized. Therefore, the terminal device can be used to manage the update of the program to be updated by the means that does not depend on the terminal device.

Configuration 13

The terminal device according to the configuration 12, in which the second external device is portable and is physically connected to the second vehicle control unit.

The terminal device of the configuration 13 updates the program of the second vehicle control unit by using the portable device physically connected to the second vehicle control unit mounted on the vehicle. Therefore, the terminal device can be used to manage the update of the program to be updated by the means that does not depend on the terminal device.

REFERENCE SIGNS LIST

1 . . . program update system, 10 . . . distribution server (first external device), 30 . . . wireless distribution server, 50 . . . connection device, 60 . . . memory device (second external device), 61, 62 ... cable, 100 ... in-vehicle control device (control device), 101 ... in-vehicle equipment, 110 ... management ECU (control device), 111 ... vehicle communication control unit, 112 ... update management unit, 113 ... external communication control unit (request reception unit, transmission control unit), 114 ... control program, 121 ... DLC, 122 ... TCU, 124 ... USB connector, 131 ... IVI system (second vehicle control unit), 132 ... engine ECU (first vehicle control unit), 133 ... shift ECU (first vehicle control unit), 134 ... steering ECU (first vehicle control unit), 135 ... meter ECU (first vehicle control unit), 200 ... update device, 201 ... control unit (terminal device), 210 ... processor, 211 ... vehicle communication control unit, 212 ... first acquisition unit, 213 ... second acquisition unit, 214 ... program acquisition unit (update program acquisition unit), 216 ... update processing unit, 220 ... storage unit, 221 ... control program, 222 ... update program storing area, 231 ... communication unit, 232 ... input unit, 234 ... USB connector, 235 ... interface, 300 ... vehicle diagnosing system, V ... vehicle

What is claimed is:

1. A control device mounted on a vehicle and including a plurality of ECUs each composed of a computer having a processor and a memory, wherein
the control device comprises a management processor that manages each of the ECUs,
by the management processor:
a program incorporated in a first ECU, which is one of the ECUs, can be updated by first updating means which acquires the program from a distribution server through a vehicle diagnosis system which has a wired connection of a cable with the control device; and
a program incorporated in a second ECU, which is one of the ECUs and which is different from the first ECU, can be updated by second updating means that is different from the first updating means, the second updating means acquires the program incorporated in the second ECU from a wireless distribution server through wireless connection,
program version designation data including data indicating an acceptable combination among a version combination of programs installed in each of the plurality of ECUs is stored in at least one memory of the distribution server and the wireless distribution server, wherein
the management processor comprises:
a request reception unit configured to cause the first updating means to receive an acquisition request of acquiring version information about a version of the program of the second ECU; and
a transmission control unit configured to cause the first updating means to transmit the version information according to the acquisition request received by the request reception unit, wherein
the management processor, triggered by the vehicle diagnosis system being connected to the control device with the wired connection of the cable, based on the acquisition request received by the request reception unit, acquires the program version designation data,
determines whether or not there is an unupdatable program that cannot be updated by the first updating means among programs to be updated that match the program version designation data,
when determining that there is the unupdatable program that cannot be updated by the first updating means, acquires update programs from the distribution server for programs that can be updated without updating the unupdatable program,
executes updating by the first updating means using the update programs obtained, and
after executing the updating by the first updating means, acquires update programs that are updated by the second updating means from the wireless distribution server so as the combination of version of programs updated by the first updating means and version of programs updated by the second updating means matches the program version designation data.

2. The control device according to claim 1, wherein the request reception unit receives the acquisition request that requests activation state information about an activation state of the second ECU, and the transmission control unit transmits the activation state information.

3. The control device according to claim 1, wherein the request reception unit is incorporated in the second ECU and receives the acquisition request that requests program number information indicating the number of programs to be updated by the second updating means, and
the transmission control unit transmits the program number information.

4. The control device according to claim 3, wherein the management processor further comprising:
an update management unit configured to detect the number of programs installed on the second ECU to generate the program number information in response to the acquisition request received by the request reception unit, and generate the version information based on the detected number of programs,
wherein the transmission control unit transmits the program number information and the version information generated by the update management unit.

5. A terminal device that is communicably connected to a vehicle control unit mounted on a vehicle via a communication cable and controls update of programs of the vehicle control unit, wherein
the vehicle control unit includes a plurality of ECUs each composed of a computer having a processor and a memory,
the vehicle control unit includes a first ECU, which is one of the ECUs, and a second ECU, which is one of the ECUs and which is different from the first ECU,
the terminal device incudes a memory and a terminal device side processor,
the memory stores program version designation data including data indicating an acceptable combination among a version combination of programs installed in each of the plurality of ECUs
by the terminal device side processor:
a program incorporated in the first ECU can be updated by first updating means using the terminal device through wired connection of the communication cable between the vehicle control unit; and
a program incorporated in the second ECU can be updated by second updating means that is different from the first updating means, wherein the second updating means acquires the program incorporated in the second ECU through wireless connection,
the terminal device side processor comprising:
a first acquisition unit configured to acquire first version information being information about a version of the program of the first ECU from the vehicle control unit, a second acquisition unit configured to acquire second version information being information about a version of the program of the second ECU from the vehicle control unit, ex a third acquisition unit configured to acquire the program version designation data, and an update program acquisition unit configured to, triggered by the terminal device being connected to the vehicle control unit with the wired connection of the communication cable, determine whether or not there is an unupdatable program that cannot be updated by the first updating means among programs to be updated that match the program version designation data, when determining that there is the unupdateable program that cannot be updated by the first updating means, acquire update programs from the distribution server for programs that can be updated without updating the unupdatable program, execute updating by the first updating means using the update programs obtained, and after executing the updating by the first updating means, acquire update programs that are updated by the second updating means from a first external device so as the combination of version of programs updated by the first updating means and version of programs updated by the first updating means and version of programs updated by the second updating means matches the program version designation data.

6. The terminal device according to claim 5, wherein the second acquisition unit acquires activation state information about an activation state of the second ECU.

7. The terminal device according to claim 5, wherein the second acquisition unit is incorporated in the second ECU and acquires program number information indicating the number of programs to be updated by the second updating means.

8. The terminal device according to claim 5, wherein the update program acquisition unit does not acquire an update program for a program that is required to be updated after the update of the program of the second ECU, among programs of the first ECU, in processing for acquiring the update program for updating the program of the first ECU.

9. The terminal device according to claim 8, wherein the terminal device side processor further comprises:

a display control unit configured to control a display, wherein the display control unit causes the display to display the necessity of updating the program of the second ECU, when a program that is required to be updated after the update of the program of the second ECU is included among the programs of the first ECU.

10. The terminal device according to claim 5, wherein the update program acquisition unit acquires the update program for updating the program of the second ECU, and outputs the acquired update program to a second external device that is different from the first external device.

11. The terminal device according to claim 10, wherein the second external device is portable and is physically connected to the second ECU.

\* \* \* \* \*